United States Patent
Heigold et al.

(10) Patent No.: US 12,073,823 B2
(45) Date of Patent: Aug. 27, 2024

(54) ASYNCHRONOUS OPTIMIZATION FOR SEQUENCE TRAINING OF NEURAL NETWORKS

(71) Applicant: Google LLC, Mountain View, CA (US)

(72) Inventors: Georg Heigold, Mountain View, CA (US); Erik Mcdermott, San Francisco, CA (US); Vincent O. Vanhoucke, San Francisco, CA (US); Andrew W. Senior, New York, NY (US); Michiel A. U. Bacchiani, Summit, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/506,540

(22) Filed: Nov. 10, 2023

(65) Prior Publication Data

US 2024/0087559 A1 Mar. 14, 2024

Related U.S. Application Data

(63) Continuation of application No. 18/069,035, filed on Dec. 20, 2022, now Pat. No. 11,854,534, which is a
(Continued)

(51) Int. Cl.
*G10L 15/06* (2013.01)
*G06N 3/045* (2023.01)
(Continued)

(52) U.S. Cl.
CPC ............ *G10L 15/063* (2013.01); *G06N 3/045* (2023.01); *G10L 15/16* (2013.01); *G10L 15/183* (2013.01)

(58) Field of Classification Search
None
See application file for complete search history.

(56) References Cited

U.S. PATENT DOCUMENTS

| 2006/0074656 A1 | 4/2006 | Mathias et al. |
| 2007/0288242 A1 | 12/2007 | Spengler et al. |
| 2011/0131642 A1 | 6/2011 | Hamura et al. |

OTHER PUBLICATIONS

'cxwangyi.wordpress.com' [online] "Why Asynchronous SGD Works Better than its Synchronous Counterpart?" Apr. 9, 2013 [retrieved on Nov. 27, 2017] Retrieved From Internet: URL<https://cxwangyi.wordpress.com/2013/04/09/why-asynchronous-sgd-works-better-than-its-synchronous-counterpart/> 3 pages.
(Continued)

*Primary Examiner* — Lennin R Rodriguez Gonzalez
(74) *Attorney, Agent, or Firm* — Honigman LLP; Brett A. Krueger; Grant Griffith

(57) ABSTRACT

Methods, systems, and apparatus, including computer programs encoded on a computer storage medium, for obtaining, by a first sequence-training speech model, a first batch of training frames that represent speech features of first training utterances; obtaining, by the first sequence-training speech model, one or more first neural network parameters; determining, by the first sequence-training speech model, one or more optimized first neural network parameters based on (i) the first batch of training frames and (ii) the one or more first neural network parameters; obtaining, by a second sequence-training speech model, a second batch of training frames that represent speech features of second training utterances; obtaining one or more second neural network parameters; and determining, by the second sequence-training speech model, one or more optimized second neural network parameters based on (i) the second batch of training frames and (ii) the one or more second neural network parameters.

20 Claims, 7 Drawing Sheets

Related U.S. Application Data continuation of application No. 17/644,362, filed on Dec. 15, 2021, now Pat. No. 11,557,277, which is a continuation of application No. 17/143,140, filed on Jan. 6, 2021, now Pat. No. 11,227,582, which is a continuation of application No. 16/863,432, filed on Apr. 30, 2020, now Pat. No. 10,916,238, which is a continuation of application No. 16/573,323, filed on Sep. 17, 2019, now Pat. No. 10,672,384, which is a continuation of application No. 15/910,720, filed on Mar. 2, 2018, now Pat. No. 10,482,873, which is a continuation of application No. 14/258,139, filed on Apr. 22, 2014, now Pat. No. 10,019,985.

(60) Provisional application No. 61/899,466, filed on Nov. 4, 2013.

(51) Int. Cl.
G10L 15/16 (2006.01)
G10L 15/183 (2013.01)

(56) References Cited

OTHER PUBLICATIONS

'www.phillong.info' [online presentation] "Recent Developments in Deep Learning," Le. Powerpoint Presentation, Stanford University and Google, Feb. 25, 2013, [retrieved on Nov. 27, 2017] Retrieved from Internet: URL<www.phillong.info/stoc13/stoc13 <http://www.phillong.info/stoc13/stoc13> _ml_quoc_le.pptx> 28 pages.
Agarwal et al. "Distributed delayed stochastic optimization," Proc. Of Advances in Neural Information Processing Systems, Dec. 2011, 9 pages.
Bishop, "Pattern Recognition and Machine Learning," Springer, 2006, 749 pages.
Bottou, "Stochastic gradient learning in neural networks," in Neuro-Nilmes, 1991, 12 pages.
Bourlard et al., "Connectionist speech recognition," Kluwer Academic Publishers, Kluwer Academic Publishers, 1994, 291 pages.
Chen et al. "Pipelined Back propagation for Context-dependent deep neural networks," Thirteen Annual Conference of the International Speech Communication Association, Sep. 2012, 4 pages.
Chen et al. "Scalable Training of Deep Learning Machines by Incremental Block Training with Intra-Block Parallel Optimization and Blockwise Model-Update Filtering," IEEE International Conference on Acoustics, Speech and Signal Processing, Mar. 2016, 5 pages.
Coates et al. "Deep learning with COTS HPC systems," Proc. Of the 30th International Conference on Machine Learning, Feb. 2013, 9 pages.
Dean et al. "Large Scale Distributed Deep Networks," Advances in Neural Information Processing Systems, Dec. 2012, 11 pages.
Dean et al., "Large scale distributed deep networks," in Advances in Neural Information Processing Systems (NIPS), 2012, 1-9.
Duchi et al. "Adaptive subgradient methods for online learning and stochastic optimization," Journal of Machine Learning Research, vol. 12, Jul. 2011,39 pages.
Heigold et al., "Multilingual acoustic models using distributed deep neural networks," in IEEE International Conference on Acoustics, Speech, and Signal Processing (ICASSP), Vancouver, Canada, Apr. 2013, 1:8619-8623.
Heigold, "A Log-Linear Discriminative Modeling Framework for Speech Recognition," Ph.D. thesis, RWTH Aachen University, Aachen, Germany, Jun. 2010, 214 pages.
Hermansky et al., "Tandem connectionist feature extraction for conventional HMM systems," in IEEE International Conference on Acoustics, Speech, and Signal Processing (ICASSP), Istanbul, Turkey, Jun. 2000, 1-4.
Hinton et al., "Deep neural networks for acoustic modeling in speech recognition: The shared views of four research groups," IEEE Signal Process. Mag., 29(6)82-97, Apr. 27, 2012.
Jaitly et al., "Application of pretrained deep neural networks to large vocabulary speech recognition, " in Interspeech, 2012, 11 pages.
Kingsbury, "Lattice-based optimization of sequence classification criteria for neural-network acoustic modeling," in IEEE International Conference on Acoustics, Speech, and Signal Processing (ICASSP), Taipei, Taiwan, Apr. 19-24, 2009, 3761-3764.
Kubo et al., "Large vocabulary continuous speech recognition based on WFST structured classifiers and deep bottleneck features," in ICASSP, 2013, 7629-7633.
Le et al., "Building high-level features using large scale unsupervised learning," in International Conference on Machine Learning, Jul. 12, 2012, 81-88.
LeCun et al. "Learning methods for generic object recognition with invariance to pose and lighting," Proc. of the CVPR Conference, Jun. 2004, 8 pages.
Legel. "Parallelized Deep Neural Networks for Distributed Intelligent Systems," Interdisciplinary Telecommunications Graduate Theses & Dissertations, Interdisciplinary Telecommunications, University of Colorado, Boulder, Jan. 1, 2013, 55 pages.
Martens. "Deep learning via Hessian-free optimization," Proc. ICML, Jun. 2010, 8 pages.
Nesterov. "Gradient methods for minimizing composite objective function," CORE Discussion Paper, Catholic University of Louvain, 2007, 32 pages.
Paine et al. "GPU Asynchronous Stochastic Gradient Descent to Speed Up Neural Network Training," arXiv 1312.6186vl, Dec. 21, 2013, 6 pages.
Povey et al. "Parallel training of DNNs with natural gradient and parameter averaging," arXiv 1410.7455v8, Jun. 22, 2015, 28 pages.
Povey, "Discriminative Training for Large Vocabulary Speech Recognition," Ph.D. thesis, Cambridge, England, Mar. 1, 2003, 170 pages.
Recht et al. "Hogwild: A lock-free approach to parallelizing stochastic gradient descent," NIPS , Dec. 2011, 9 pages.
Rice et al. "Adaptive Variable-Length Coding for Efficient Compression of Spacecraft Television Data," Transaction on Communication Technology, vol. 16(9), Dec. 1971, 9 pages.
Sainath et al. "Parallel deep neural network training for IVCSR tasks using Blue Gene/Q," Proc. of Interspeech, Sep. 2014, 5 pages.
Schalkwyk et al., "Google search by voice: A case study," Advances in Speech Recognition: Mobile Environments, Call Centers and Clinics, Springer (2010), 1-35.
Seide et al. "1-bit stochastic gradient descent and its application to data-parallel distributed training of speech DNNs," Proc. Ofinterspeech, Sep. 2014, 5 pages.
Seide et al. "Feature engineering in context-dependent deep neural networks for conversational speech transcription," Proc. Of IEEE ASRU, Dec. 2011, 6 pages.
Seide et al. "On parallelizability of stochastic gradient descent for speech DNNs," Proc. of ICASSP, May 2014, 5 pages.
Seide et al., "Conversational speech transcription using context-dependent deep neural networks," in Interspeech, 2011, 437-440.
Strom. "A tonotopic artificial neural network architecture for phoneme probability estimation," IEEE Worship on speech recognition and understanding, Dec. 1997, 8 pages.
Su et al., "Error back propagation for sequence training of context-dependent deep networks for conversational speech transcription," in ICASSP, 2013, 6664-6668.
Vesely et al., "Sequence-discriminative training of deep neural networks," in Interspeech, 2013, 5 pages.
Zeiler et al. "On Rectified Linear Units for Speech Processing," IEEE International Conference on Acoustics, Speech and Signal Processing, May 2013, 5 pages.
Zeiler. "Adadelta: An adaptive learning rate method," arXiv 1212.570lvl, Dec. 22, 2012, 6 pages.
Zhang et al. "Asynchronous Stochastic Gradient Descent for DNN training," IEEE International Conference on Acoustics, Speech and Signal Processing, May 26-31, 2013, 4 pages.
USPTO. Office Action relating to U.S. Appl. No. 17/644,362, dated Jul. 11, 2022.

(56) References Cited

OTHER PUBLICATIONS

USPTO. Office Action Relating to U.S. Appl. No. 18/069,035, dated Jun. 8, 2023.

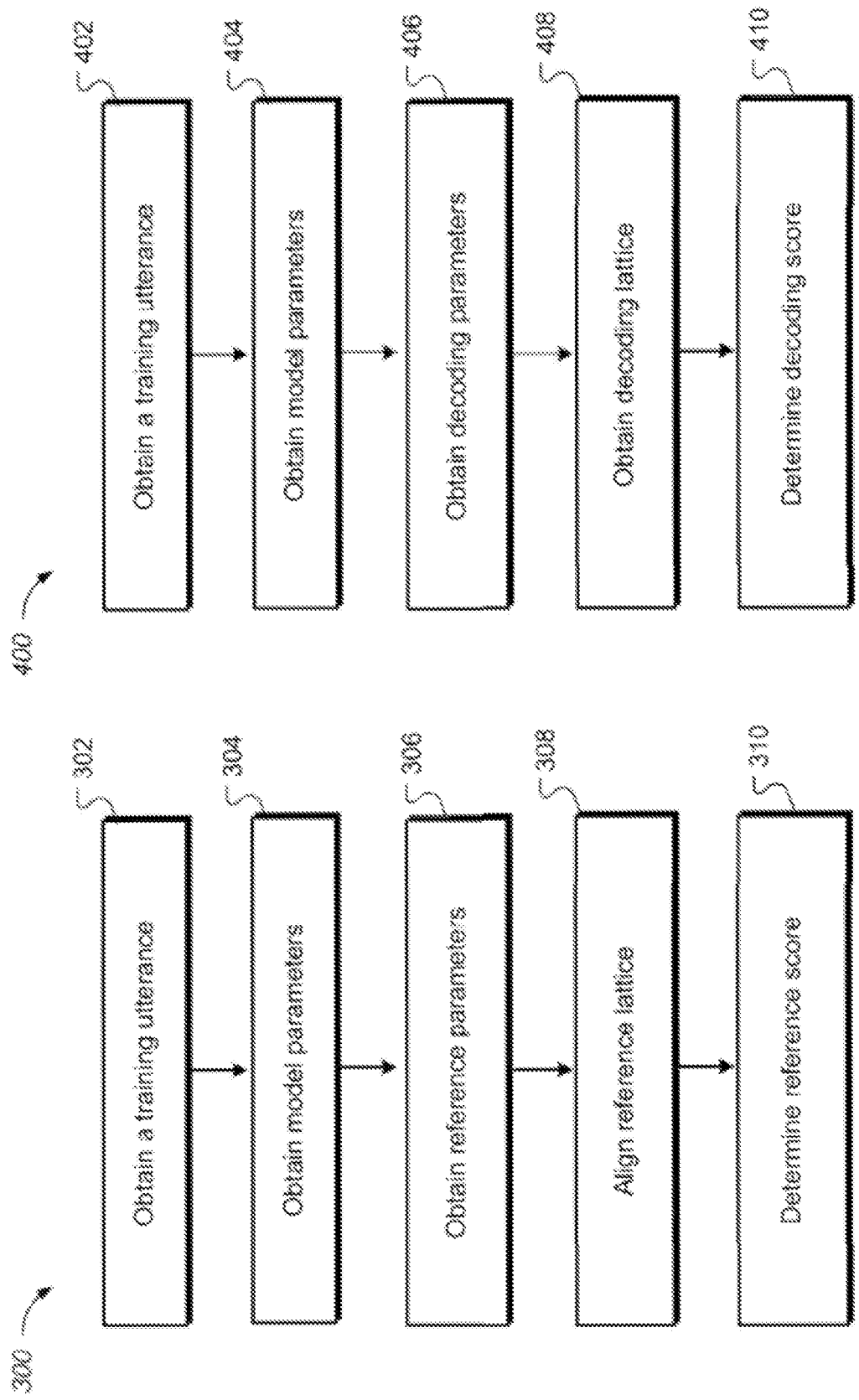

ASYNCHRONOUS OPTIMIZATION FOR SEQUENCE TRAINING OF NEURAL NETWORKS

CROSS-REFERENCE TO RELATED APPLICATIONS

This patent application is a continuation of, and claims priority under 35 U.S.C. § 120 from, U.S. patent application Ser. No. 18/069,035, filed on Dec. 20, 2022, which is a continuation of U.S. patent application Ser. No. 17/644,362, filed on Dec. 15, 2021, which is a continuation of U.S. patent application Ser. No. 17/143,140, filed on Jan. 6, 2021, which is a continuation of U.S. patent application Ser. No. 16/863,432, filed on Apr. 30, 2020, which is a continuation of U.S. patent application Ser. No. 16/573,323, filed on Sep. 17, 2019, which is a continuation of U.S. patent application Ser. No. 15/910,720, filed on Mar. 2, 2018, which is a continuation of U.S. patent application Ser. No. 14/258,139, filed on Apr. 22, 2014, which claims priority under 35 U.S.C. § 119(e), to U.S. Provisional Application No. 61/899,466, filed on Nov. 4, 2013. The disclosures of these prior applications are considered part of the disclosure of this application and are hereby incorporated by reference in their entireties.

TECHNICAL FIELD

This specification generally relates to training speech models for speech recognition.

BACKGROUND

In some instances, it may be useful to sequence-train a speech model to recognize a spoken phrase that includes words uttered in a sequence. Sequence training requires computationally intensive processing compared to frame-level training. Asynchronous optimization may allow sequence training of multiple speech models to update model parameters in parallel and enable scalable sequence training.

SUMMARY

According to an aspect of the subject matter described in this specification, a speech model based on a neural network may be trained using training utterances of a set of training speakers. Each training utterance may include a sequence of spoken words. Multiple speech models may be asynchronously trained in parallel, where the asynchrony may allow each speech model to be locally optimized.

In general, an aspect of the subject matter described in this specification can be embodied in methods that include the actions of obtaining, by a first sequence-training speech model, a first batch of training frames that represent speech features of first training utterances, obtaining, by the first sequence-training speech model, one or more first neural network parameters, determining, by the first sequence-training speech model, one or more optimized first neural network parameters based on (i) the first batch of training frames and (ii) the one or more first neural network parameters, obtaining, by a second sequence-training speech model, a second batch of training frames that represent speech features of second training utterances, where the obtaining of the second batch of training frames by the second sequence-training speech model is independent of the obtaining of the first batch of training frames by the first sequence-training speech model, obtaining one or more second neural network parameters, where the obtaining of the second neural network parameters by the second sequence-training speech model is independent of (i) the obtaining of the first neural network parameters by the first sequence-training speech model and (ii) the determining of the one or more optimized first neural network parameters by the first sequence-training speech model, and determining, by the second sequence-training speech model, one or more optimized second neural network parameters based on (i) the second batch of training frames and (ii) the one or more second neural network parameters, where the determining of the one or more optimized second neural network parameters by the second sequence-training speech model is independent of the determining of the one or more optimized first neural network parameters by the first sequence-training speech model These and other embodiments may each optionally include one or more of the following features. Obtaining a first batch of training frames that represent speech features of first training utterances may include obtaining, by a first decoder associated with the first sequence-training speech model, an utterance of the first training utterances, determining, by the first decoder, a reference score associated with the utterance, determining, by the first decoder, a decoding score associated with the utterance, and determining, by the first decoder, a training frame representing acoustic characteristics of the utterance based on the reference score.

Determining a reference score associated with the utterance may include obtaining, by the first decoder, the one or more first neural network parameters, obtaining, by the first decoder, one or more reference parameters representing a true transcription of the utterance, and determining, by the first decoder, a reference lattice based on (i) the utterance of the first training utterances, (ii) the one or more first neural network parameters, and (iii) the one or more reference parameters representing the true transcription of the utterance.

Obtaining a first batch of training frames that represent speech features of first training utterances may include determining, by the first decoder, a decoding score associated with the utterance, and where determining the training frame representing the acoustic characteristics of the utterance may include determining, by the first decoder, the training frame representing the acoustic characteristics of the utterance based on the reference score and the decoding score Determining a decoding score associated with the utterance may include obtaining, by the first decoder, the one or more first neural network parameters, obtaining, by the first decoder, one or more decoding parameters representing a candidate transcription of the utterance, and determining, by the first decoder, a decoding lattice based on (i) the utterance of the first training utterances, (ii) the one or more first neural network parameters, and (iii) the one or more decoding parameters representing the candidate transcription of the utterance. The training frame may include an outer gradient representing a difference between the reference score and the decoding score.

The actions may include before obtaining, by the first sequence-training speech model, the first batch of training frames, obtaining an initial batch of training frames, where each training frame represents a sequence of utterances spoken by a training speaker, pseudo-randomly selecting candidate training frames from the initial batch of training frames, and generating the first batch of training frames using the pseudo-randomly selected candidate training frames.

Determining one or more optimized first neural network parameters may include obtaining an auxiliary function representing an approximation of a training objective function of the first sequence-training speech model, and determining the one or more optimized first neural network parameters using the auxiliary function.

The training objective function may be a maximum likelihood (ML) objective function, a maximum mutual information (MMI) objective function, a minimum phone error (MPE) objective function, or a state-level minimum Bayes risk objective function.

Determining one or more optimized first neural network parameters may include updating a last hidden layer of a neural network of the first sequence training speech model, using (i) the first batch of training frames and (ii) the one or more first neural network parameters to determine the one or more optimized first neural network parameters.

Determining one or more optimized first neural network parameters may include updating a plurality of hidden layers of a neural network of the first sequence training speech model, using (i) the first batch of training frames and (ii) the one or more first neural network parameters to determine the one or more optimized first neural network parameters.

Advantageous implementations may include one or more of the following features. Asynchronous optimization allows multiple speech models to be trained in parallel, which allows the system to scale the sequence training using large data sets. Shuffling of training utterance input allows randomization of training utterances that may provide better model parameters. Model optimization using an auxiliary function allows a speech model to be optimized locally to increase efficiency.

The details of one or more implementations are set forth in the accompanying drawings and the description below. Other potential features and advantages will become apparent from the description, the drawings, and the claims.

BRIEF DESCRIPTION OF THE DRAWINGS

FIG. 3 is a flow chart illustrating an example process for determining a reference score in a decoder.

FIG. 4 is a flow chart illustrating an example process for determining a decoding score in a decoder.

Like reference numbers and designations in the various drawings indicate like elements.

DETAILED DESCRIPTION

A speech recognition process is the task of transcribing one or more words in a phrase spoken by a user. In general, a computer-implemented speech model may be trained to perform the speech recognition process. In some implementations, a speech model may be implemented using a neural network, where the neural network may be optimized through sequence training. One goal of sequence training is to minimize word error, so the speech model may recognize the phrase as a whole to preserve the context of the phrase. This is in contrast with frame-level training, where the objective may be to minimize phonetic error without considering the context of the phrase.

Neural networks may be established for acoustic modeling in speech recognition. In some implementations, a framework to incorporate a neural network into a Hidden Markov Models (HMM)-based decoder may include the hybrid approach. In some other implementations, the framework to incorporate a neural network into a HMM-based decoder may include the tandem approach.

Figure 1A:
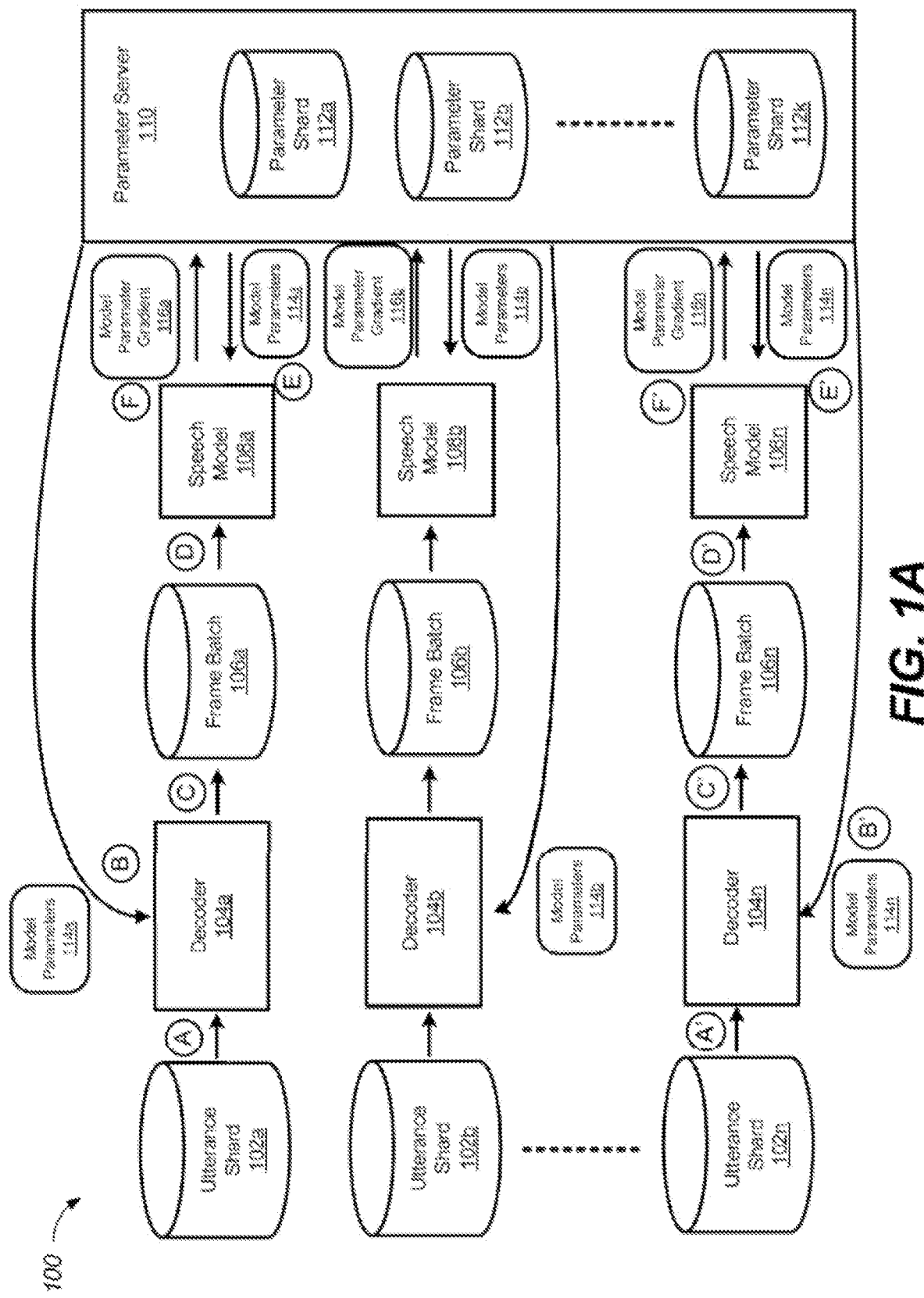
FIG. 1A is a block diagram of an example system for asynchronous optimization of multiple speech models in parallel.

In some implementations, stochastic gradient descent (SGD) may be used as the optimization procedure for frame training of neural networks. However, the formulation of SGD makes the optimization a sequential process that is a challenge to parallelize, and hence creates issues in scaling to large datasets. In general, for stable SGD optimization, the observations should be randomized (shuffled). This is in contrast with the computation of the gradient which is utterance-derived and hence sequential in nature and a challenge to shuffle. In general, batch optimization schemes are a more natural match for this type of objective. Asynchronous training of multiple speech models in parallel may enable easier scalability in the sequence training process using large training datasets, FIG. 1A is a block diagram of an example system 100 that can asynchronously train multiple speech model replicas in parallel, where each speech model is implemented based on a neural network. The system 100 includes utterance shards 102a-n, decoders 104a-n, frame batches 106-n, speech models 108a-n, and a parameter server 110. Briefly, in the system 100, the training data may be divided into a number of utterance shards 102a-n, and sequence training may be run with speech models 108a-n for each of the utterance shards. The value of n may be any integer greater than one.

In some implementations, sequence training may run an independent decoder 104 (e.g., any one of 104a-n) in the input layer of each model 108 (e.g., any one of 108a-n) to generate on-the-fly lattices, and then computes an outer gradient. A centralized parameter server 110 may be configured to keep the current state of all model parameters for the speech model replicas 108a-n. In some implementations, the model parameters may include the weights and biases of hidden layers of a neural network corresponding to a speech model of speech model replicas 108a-n. In some implementations, the centralized parameter server 110 may be sharded across many parameter shards 112a-112k. The value of k may be any integer greater than one.

In some implementations, the models 108a-n may periodically update their model parameters. For example, the models 108a-n may asynchronously request fresh values from the parameter server 110. In some implementations, the models 108a-n may send updates to the parameter server 110. In some implementations, the decoders 104a-n may request fresh values from the parameter server 110 to avoid stale outer gradients. The functions performed by the system 100 can be performed by individual computer systems or can be distributed across multiple computer systems over a network.

FIG. 1 also illustrates an example flow of data, shown in stages (A) to (F). Stages (A) to (F) may occur in the illustrated sequence, or they may occur in a sequence that is different than in the illustrated sequence. In some implementations, one or more of the stages (A) to (F) may occur offline, where the system 100 may perform computations when the system 100 is not connected to a network.

During stage (A), the decoder 104a obtains a set of training utterances from the utterance shard 102a. In some implementations, the training utterances may be one or more predetermined words spoken by the training speakers that were recorded and accessible by the decoder 104a. Each training speaker may speak a predetermined utterance to a computing device, and the computing device may record an audio signal that includes the utterance. For example, each training speaker may be prompted to speak the training phrase "Hello Phone, show me the nearest post office." In some implementations, each training speaker may be prompted to speak the same training phrase multiple times. The recorded audio signal of each training speaker may be transmitted to a computing system not shown here, and the computing system may collect the recorded audio signals and divide the utterances into the utterance shards 102a-n. In other implementations, the various training utterances in the utterance shards 102a-n may include utterances of different words.

During stage (B), the decoder 104a obtains model parameters 114a from the parameter server 110, and for each training utterance, the decoder 104a determines an output frame to be used for training the neural network of the speech model 108a. As described in more details in FIG. 1B, the decoder 104a may determine an output frame representing acoustic characteristics of the utterance based on the reference score and the decoding score. In some implementations, the output frame may be a maximum mutual information (MMI) soft frame that is used to represent training criterion for sequence training of the speech model 108a. For example, the MMI soft frame corresponding to a training utterance may be represented by a vector that includes speech content of the training utterance (e.g., log energy of the training utterance audio signal), one or more soft-labels (e.g., outer gradients for individual HMM phonetic states in a frame), and/or a confidence score associated with the decoded training utterance.

During stage (C), the output frames from the decoder 104a are batched into a frame batch 106a. In some implementations, as described in more details in FIG. 1B, the output frames may be randomly shuffled before the frame batch 106a is generated. The randomization of training utterances may provide a lower word error rate for a speech model optimized using a stochastic optimization process.

During stage (D), the frame batch 106a is input to a speech model 108a for training model parameters. During stage (E), the speech model 108a obtains model parameters 114a from the parameter server 110. As described in more details in FIG. 1C, the speech model 108a may then determine updated model parameters based on the frame batch 106a and the model parameters 114a. In some implementations, stochastic gradient descent process may be used to optimize the updated model parameters.

In some implementations, the model parameters 114a received by the speech model 108a may not be the most updated model parameters stored in the parameter server because the model parameters are being updated by multiple speech model replicas 108b-n asynchronously and in parallel. In some implementations, the speech model 108a may apply an auxiliary function, which is an approximation to the original training objective, to optimize the model parameters locally without taking into considerations of further parameter updates by other speech models 108b-n.

During stage (F), the speech model 108a outputs model parameter gradients 116a that represent differences between the model parameters 114a and updated model parameters that have been optimized by the speech model 108a. In some implementations, the speech model 108a may send the model parameter gradients 116a to the parameter server 110, and the parameter server 110 may determine updated model parameters based on the stored model parameters 114a and the received model parameter gradients 116a. In some other implementations, the speech model 108a may send the updated model parameters to the parameter server 110, and the parameter server 110 may replace the model parameters 114a with the updated model parameters.

FIG. 1 further illustrates another example flow of data, shown in stages (A') to (F'). The stages (A') to (F') are similar to stages (A) to (F) described above, but stages (A') to (F') are performed independently from stages (A) to (F). As used in this specification, to perform a specific stage/operation independently from a second stage/operation refers to performing the specific stage/operation without the requirement to check when the second stage/operation is being performed. In general, the system 100 in FIG. 1 is asynchronous in several aspects: the speech model replicas 108a-n, parameter server shards 112a-k, and decoders 104a-n may all run independently of each other. Since decoding and forced alignment to compute the gradient take time, asynchrony may be introduced as those gradients are computed using stale and even inconsistent model parameters. For evaluation, a number of additional model replicas may be run to compute the statistics. In some implementations, the amount of asynchrony depends on the number of model replicas and the batch size. For example, for 50 replicas, the average staleness of the outer gradients is around one minute, corresponding to a few hundred DNN update steps. Alternatively, a different number of model replicas (e.g., 5, 100, 500, etc.) or the batch size (e.g., 100, 1000, 10000, etc.) may be used.

During stage (A'), the decoder 104n obtains a set of training utterances from the utterance shard 102n. In some implementations, the decoder 104n may obtain the set of training utterances from the utterance shard 102n independently and asynchronously from the other decoders 104a-m.

During stage (B'), the decoder 104n obtains model parameters 114n from the parameter server 110, and for each training utterance, the decoder 104n determines an output frame to be used for training the neural network of the speech model 108n. In some implementations, the decoder 104n may obtain the model parameters 114n independently and asynchronously from the other decoders 104a-m. For example, the decoder 104n may obtain the model parameters 114n after the speech model 108a has updated the model parameters in the parameter server 110.

During stage (C'), the output frames from the decoder 104n are batched into a frame batch 106n. In some implementations, the decoder 104n may generate the frame batch 106n independently and asynchronously from the other decoders 104a-m.

During stage (D'), the frame batch 106n is input to a speech model 108n for training model parameters. During stage (E'), the speech model 108n obtains model parameters 114n from the parameter server 110. In some implementations, the speech model 108n may obtain model parameters 114n from the parameter server 110 independently and asynchronously from the other speech models 108a-m.

During stage (F'), the speech model 108n outputs model parameter gradients 116n that represent differences between the model parameters 114n and updated model parameters that have been optimized by the speech model 108n. In some implementations, the speech model 108n may send the model parameter gradients 116n to the parameter server 110, and the parameter server 110 may determine updated model parameters based on the stored model parameters 114n and the received model parameter gradients 116n. In some implementations the speech model 108n may send the model parameter gradients 116n to the parameter server 110 independently and asynchronously from the other speech models 108a-m.

Figure 1B:
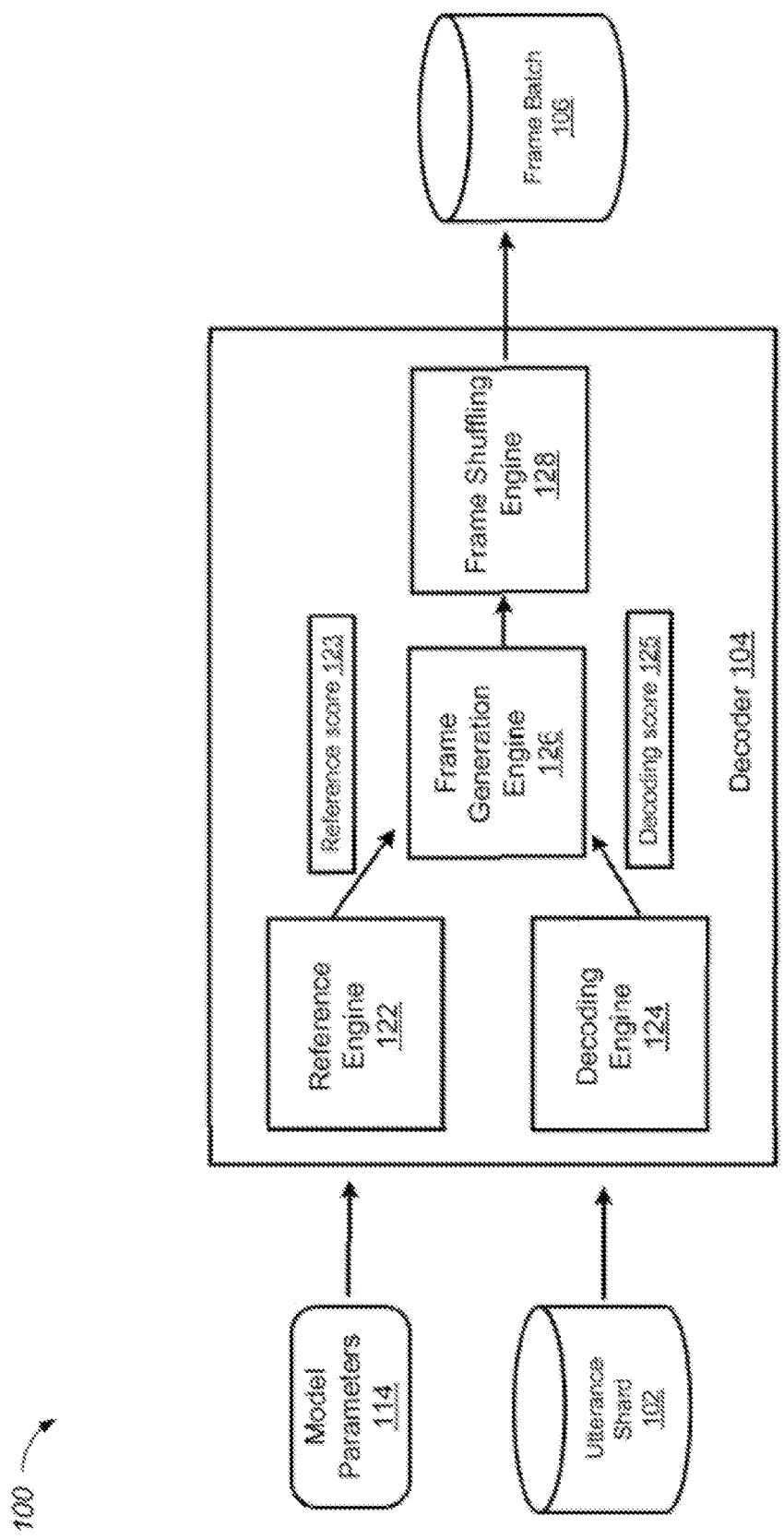
FIG. 1B is a block diagram of an example system for generating a frame batch for training a speech model.

FIG. 1B is a block diagram of an example system 100 for generating a frame batch for training a speech model. Briefly, the decoder 104 obtains model parameters 114 and training utterances stored in the utterance shard 102, and generates a frame batch 106 used for training a speech model 108. The decoder 104 includes a reference engine 122, a decoding engine 124, a frame generation engine 126, and a frame shuffling engine 128. The decoder 104 described here may be any one of the decoders 104a-n described in FIG. 1A.

As used in this specification, an "engine" (or "software engine") refers to a software implemented input/output system that provides an output that is different from the input. An engine can be an encoded block of functionality, such as a library, a platform, a Software Development Kit ("SDK"), a software module, or an object.

In general, the reference engine 122 is configured to generate a reference score 123 that represents the transcript truth of a training utterance. In some implementations, the reference engine 122 may obtain model parameters 114 from the parameter server 110. The reference engine 122 may then identify one or more reference parameters associated with the training utterance. In some implementations, the reference parameters may include a true transcription of the training utterance. In some implementations, the reference parameters may include acoustic features of the training utterance. For example, the acoustic signal of the training utterance may be segmented into multiple time windows. A Fast Fourier Transform (FFT) may be performed on the audio in each window. The results of the FFT may be shown as time-frequency representations of the audio in each window. From the FFT data for a window, features that are represented as an acoustic feature vector for the window may be determined. The acoustic features may be determined by binning according to filterbank energy coefficients, using a mel-frequency ceptral component (MFCC) transform, using a perceptual linear prediction (PLP) transform, or using other techniques. In some implementations, the logarithm of the energy in each of various bands of the FFT may be used to determine acoustic features.

Figure 6A:
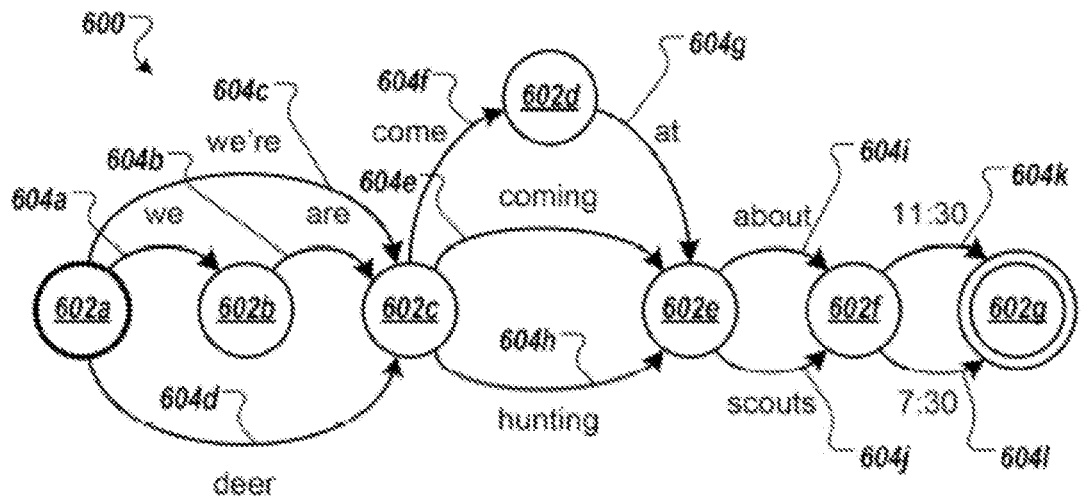
FIGS. 6A and 6B are diagrams that illustrate examples of word lattices.
Figure 6B:
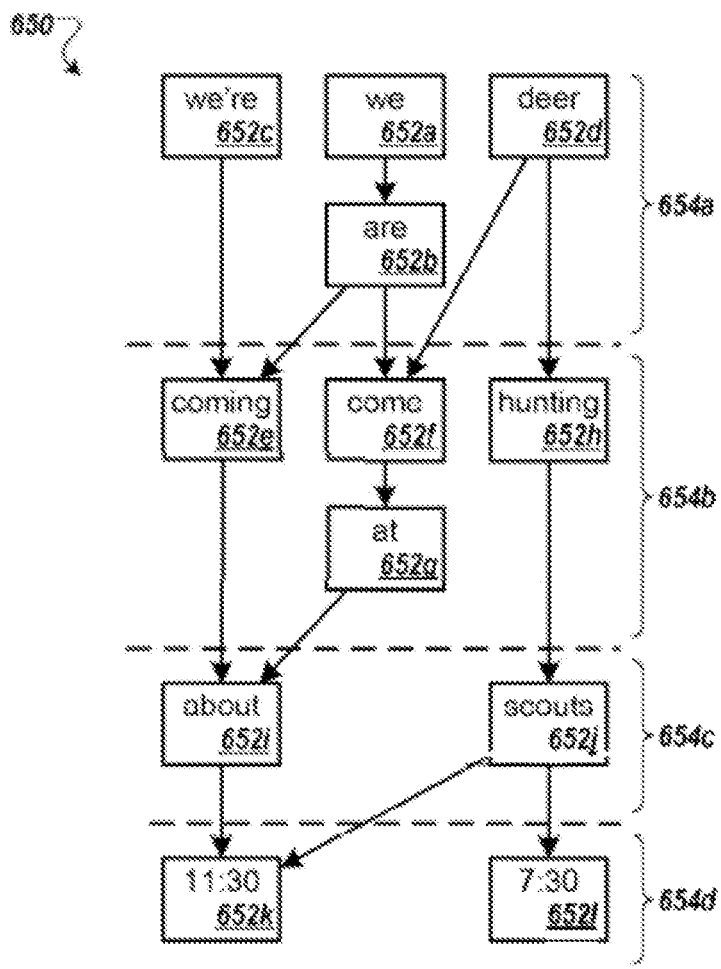

The reference engine 122 may then aligns a lattice corresponding to the training utterance and generates a reference lattice. The reference lattice represents the combination of words that form the true transcriptions for the training utterance. Examples of word lattices are shown in FIGS. 6A and 6B. In some implementations, the reference lattice may be determined based on (i) the utterance, (ii) the speech model parameters, and (iii) the reference parameters representing the true transcription of the utterance.

The reference engine 122 may then determine a reference score for the training utterance. As described in more details in FIG. 1C, in some implementations, the reference score may be a sub-component of an outer gradient function. For example, the sub-component may include the state occupancy of a frame t within a training utterance u.

In general, the decoding engine 124 is configured to generate a decoding score 125 that represents the decoded transcription of a training utterance. In some implementations, the decoding engine 124 may obtain model parameters 114 from the parameter server 110. The decoding engine 124 may then identify one or more decoding parameters associated with the training utterance. In some implementations, the decoding parameters may include acoustic features of the training utterance. In some implementations, the decoding parameters may represent a candidate transcription of the utterance.

The decoding engine 124 may then generate a decoding lattice corresponding to the training utterance. The decoding lattice represents the combination of words that form different candidate transcriptions for the training utterance. Examples of word lattices are shown in FIGS. 6A and 6B. In some implementations, the decoding lattice may be determined based on (i) the utterance, (ii) the speech model parameters, and (iii) the decoding parameters representing the candidate transcription of the utterance.

The decoding engine 124 may then determine a decoding score for the training utterance. As described in more details in FIG. 1C, in some implementations, the decoding score may be a sub-component of an outer gradient function.

In general, the frame generation engine 126 is configured to generate an output frame corresponding to the training utterance. In some implementations, the output frame may be represented by a vector that includes speech content of the training utterance (e.g., log energy of the training utterance audio signal), one or more soft-labels (e.g., outer gradients for individual HMM phonetic states in a frame), and/or a confidence score associated with the decoded training utterance. For example, the output frame may include output gradients representing differences between the true transcription and the candidate transcription of the utterance. In some implementations, the outer gradient depends on the model parameters 114, and the outer gradient cannot be pre-computed. In some implementations, the outer gradients can be negative and sum up to zero. In general, the gradient is exact for a single, synchronous parameter update as is the case for SGD or batch optimization. However, the gradient may only be approximate for asynchronous SGD (ASGD) because the outer gradients may not be updated over multiple parameter updates.

In general, the frame shuffling engine 128 is configured to randomly select output frames to output a frame batch 106. The shuffling of training data for SGD has significant impact on the performance. For example, a frame batch 106 may have a batch size N, where N is an integer greater than one. In some implementations, the batch size N may be constant. Each slot in the batch may load a separate utterance and process the frames within an utterance one by one. When all frames of an utterance are consumed, another utterance is loaded. In some implementations, the shuffling may happen at two different levels: a batch consists of frames each from different, random utterances, and a large component of the randomization comes from running multiple model replicas independently and asynchronously on different subsets of utterances. Note that shuffling does not involve shuffling the frames within an utterance because the context of the utterance needs to be preserved in a speech recognition process using sequence decoding.

Figure 1C:
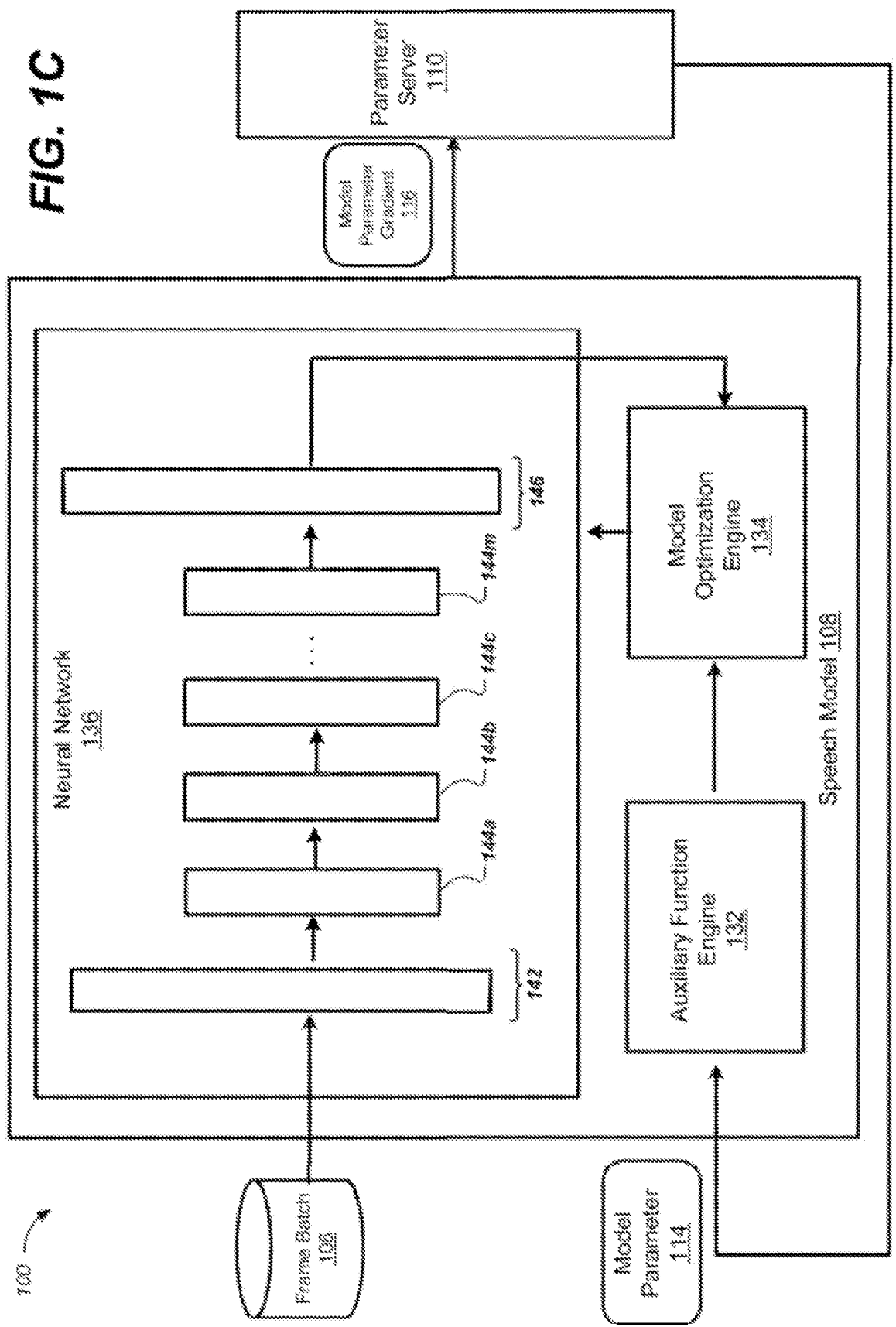
FIG. 1C is a block diagram of an example system for training a neural network of a speech model.

FIG. 1C is a block diagram of an example system 100 for training a neural network of a speech model. Briefly, the speech model 108 obtains a frame batch 106 and model parameters 114, and generates model parameter gradients 116 that represent updated model parameters. The speech model 108 includes a neural network 136, an auxiliary function engine 132, and a model optimization engine 134.

The speech model 108 described here may be any one of the speech models 108a-n described in FIG. 1A.

In general, the neural network 136 may serve as a speech model and indicate likelihoods that acoustic feature vectors represent different phonetic units. The neural network 136 includes an input layer 142, a number of hidden layers 144a-144m, and an output layer 146. The neural network 136 may receive acoustic feature vectors in the frame batch 106 as input.

In general, the model optimization engine 134 is configured to train a neural network as a speech model. In some implementations, a speech model implemented using a neural network may be implemented as follows. Let $X=x_1, \ldots, x_T$ denote a sequence of T feature vectors and W a word sequence. According to the HMM assumption, the probability for acoustic models may be decomposed as shown in Equation (1), below:

$$P(X/W) = \Sigma_{s_1, \ldots, s_T \in W} \pi_{t=1}^{T} P(x_t|s_t) p(s_t|s_{t-1}) \quad (1)$$

In Equation (1), the marginalization is over the HMM states $s_1, \ldots, s_T$ representing the given word sequence W. In the hybrid modeling approach, the emission probability may be represented as p(x|s)=p(s|x)p(x)/p(s) (Bayes rule). The state posterior p(s|x) may be estimated with a static classifier. The state prior p(s) is the relative state frequency. The data likelihood p(x) does not depend on state s and thus can be ignored for decoding/lattice generation and forced alignment. The model parameters may include the weights and biases of one or more neural network layers, which may be estimated by minimizing the cross-entropy (CE) on all utterances u and frames t as shown in Equation (2), below:

$$F_{CE}(\theta) = -\frac{1}{T} \sum_u \sum_{t=1}^{T_u} \sum_a l_{ut}(s) \log p_\theta(s \mid x_{ut}) \quad (2)$$

Here, $$T = \sum_u T_u$$

is the total number of frames. The targets may be set to $l_{ut}(s)=\delta(s, s_{ut})$ for fixed state alignments $S_{u1}, \ldots, S_u T_u$, where δ denotes the Kronecker delta.

An example training criterion for sequence training is maximum mutual information (MMI) as shown in Equation (3), below:

$$F_{MMI}(\theta) - \frac{1}{T} \sum_u \log \frac{p_\theta(X_u \mid W_u)^{K_p(W_u)}}{\sum_W p_\theta(X_u \mid W_u)^{k_p(W)}} \quad (3)$$

In some implementations, a weak language model may be used for sequence training. For example, a unigram language model may be used and the language model weight $\kappa^{-1}$ may be attached to the acoustic model. The logarithm diverges if the argument goes to zero, i.e., if the correct word sequence has zero probability in decoding. To avoid numerical issues with such utterances, the frame rejection heuristic may be used. For example, frames with zero state occupancy, $\gamma_{ut}^{(den)}(s)=0$, may be discarded. In some implementations, regularization (e.g., l2-regularization around initial network) or smoothing (e.g., the H-criterion) may be used.

In some implementations, the gradient of the training criterion can be written as shown in Equation (4), below:

$$\nabla F_{MMI}(\theta) = -\frac{1}{T} \sum_u \sum_{t=1}^{T_u} \sum_a K[\gamma_{\theta,ut}^{num}(s) - \gamma_{\theta,ut}^{(den)}(s)] \times \nabla \log p_\theta(s \mid x_{ut}) \quad (4)$$

In equation (4), $\gamma_{\theta,ut}^{(num/den)}(S)$ denotes the numerator/denominator state occupancy for utterance u and frame t. Relating to the chain rule terminology, K $[\gamma_{\theta,ut}^{num}(s) - \gamma_{\theta,ut}^{(den)}(s)]$ and $\nabla \log p_\theta(s|x_{ut})$ may be referred to as the outer and inner gradients, respectively. In some implementations, the outer gradient depends on the model parameters θ, and the outer gradient cannot be pre-computed. In some implementations, the outer gradients can be negative and sum up to zero. In some implementations, given the outer gradient encoded as targets, the inner gradient may be computed in the same way as the gradient for $F_{CE}(\theta)$. In general, the gradient is exact for a single, synchronous parameter update as is the case for SGD or batch optimization. However, the gradient may only be approximate for ASGD because the outer gradients may not be updated over multiple parameter updates.

In general, the auxiliary function engine 132 is configured to apply an auxiliary function to locally optimize the neural network based on received model parameter 114 and outer gradients. The use of an auxiliary function allows more formal reasoning and justification of the use of ASGD optimization for sequence training. Auxiliary functions are approximations to the original training objective that may be simpler to optimize. Here, "simpler" means that the auxiliary function may look like a frame-level training criterion (e.g., Equation 2) that can be (partially) optimized with a stand-alone system such as the ASGD system 100. In some implementations, the optimization of the total training criterion may be performed iteratively by updating the auxiliary function at the current parameter estimate 0' and optimizing the auxiliary function to obtain a new estimate 0.

In some implementations, an auxiliary function may be a function that makes tangential contact with the training criterion at θ' or lie in the hypograph of the training criterion. This type of auxiliary functions may be easy to construct although little can be said about convergence. Constructive and efficient lower bounds may be harder to find but may lead to generalized Expectation-Maximization, with stronger convergence properties, in particular convergence to a local optimum. In general, the tangential contact is only locally valid and requires frequent updates of the outer gradient to guarantee stable convergence. In contrast, a lower bound may be globally valid and expected to be less sensitive to frequent updates of the outer gradient.

As an example, the following auxiliary function, as shown in Equation (5) below, may be used for $F_{MMI}$ (Equation 3)

$$T_{MMI}(\theta', \theta) = -\frac{1}{T} \sum_u \sum_{t=1}^{T_u} \sum_s l_{\theta',ut}(s) \log p_\theta(s \mid x_{ut}) + F_{MMI}(\theta') \text{ with} \quad (5)$$

$$l_{\theta',ut}(s) = \kappa[\gamma_{\theta,ut}^{(num)}(s) - \gamma_{\theta,ut}^{(num)}(s)] \text{ to enforce}$$

$$\nabla T_{MMI}(\theta', \theta)|_{\theta=\theta'} = \nabla F_{MMI}(\theta', \theta)|_{\theta=\theta'}$$

After the training criteria are satisfied, the model optimization engine 134 may determine updated model parameters. The speech model 108 outputs model parameter gradients 116 that represent differences between the model parameters 114 and updated model parameters that have been optimized by the speech model 108.

Figure 2:
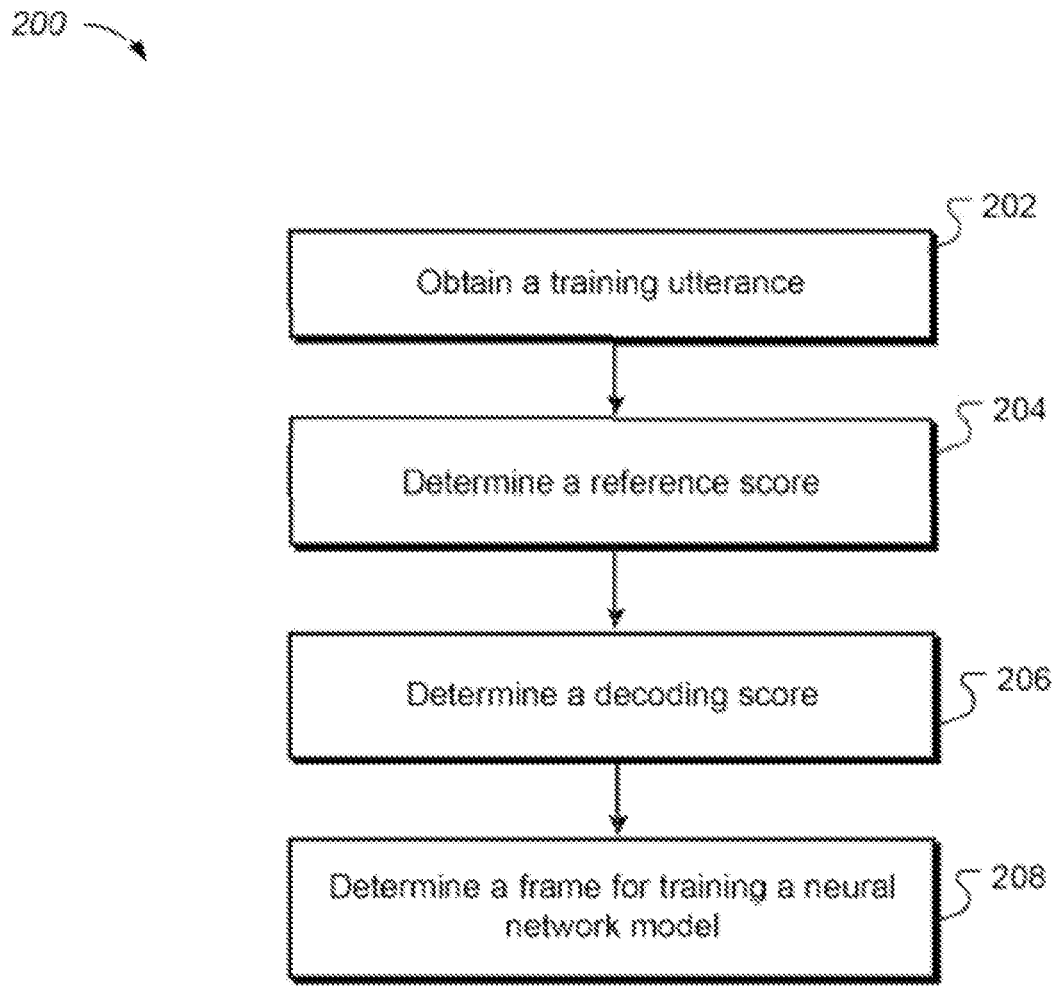
FIG. 2 is a flow chart illustrating an example process for determining a frame for training a speech model.

FIG. 2 is a flow chart illustrating an example process 200 for determining a frame for training a speech model. The process 200 may be performed by data processing apparatus, such as the decoder 104 described above or another data processing apparatus.

The system obtains a training utterance (202). In some implementations, the training utterance may be one or more predetermined words spoken by a training speaker that were recorded and accessible by the system. In some implementations, the various training utterances in an utterance shard may include utterances of different words.

The system determines a reference score for the training utterance (204). As described in more details in FIG. 3 below, the reference score may be a sub-component of an outer gradient function that represents the transcript truth of the training utterance.

The system determines a decoding score for the training utterance (206). As described in more details in FIG. 4 below, the decoding score may be a sub-component of an outer gradient function that represents the candidate transcript of the training utterance.

The system determines a frame for training a neural network model (208). In some implementations, the output frame may be a maximum mutual information (MMI) soft frame that is used to represent training criterion for sequence training of the speech model. For example, the MMI soft frame corresponding to the training utterance may be represented by a vector that includes speech content of the training utterance (e.g., log energy of the training utterance audio signal), one or more soft-labels (e.g., outer gradients for individual HMM phonetic states in a frame), and/or a confidence score associated with the decoded training utterance.

FIG. 3 is a flow chart illustrating an example process 300 for determining a reference score in a decoder. The process 300 may be performed by data processing apparatus, such as the decoder 104 described above or another data processing apparatus.

The system obtains a training utterance (302). The system also obtains model parameters from a parameter server (304). In some implementations, the model parameters may include the weights and biases of hidden layers of a neural network corresponding to a speech model.

The system obtains one or more reference parameters (306). In some implementations, the one or more reference parameters may represent a true transcription of the utterance. In some implementations, the reference parameters may include a true transcription of the training utterance. In some implementations, the reference parameters may include acoustic features of the training utterance.

The system aligns reference lattice (308). In some implementations, the reference lattice may be determined based on (i) the utterance of the first training utterances, (ii) the one or more first neural network parameters, and (iii) the one or more reference parameters representing the true transcription of the utterance. The system then determines a reference score (310). In some implementations, the reference score may be a sub-component of an outer gradient function that represents the transcript truth of the training utterance.

FIG. 4 is a flow chart illustrating an example process 400 for determining a decoding score in a decoder. The process 400 may be performed by data processing apparatus, such as the decoder 104 described above or another data processing apparatus.

The system obtains a training utterance (402). The system also obtains model parameters from a parameter server (404). The system then obtains decoding parameters (406). In some implementations, the decoding parameters may include acoustic features of the training utterance. In some implementations, the decoding parameters may represent a candidate transcription of the utterance.

The system obtains a decoding lattice (408). The decoding lattice represents the combination of words that form different candidate transcriptions for the training utterance. In some implementations, the decoding lattice may be determined based on (i) the utterance, (ii) the speech model parameters, and (iii) the decoding parameters representing the candidate transcription of the utterance.

The system determines a decoding score (410). In some implementations, the decoding score may be a sub-component of an outer gradient function that represents the candidate transcript of the training utterance.

Figure 5:
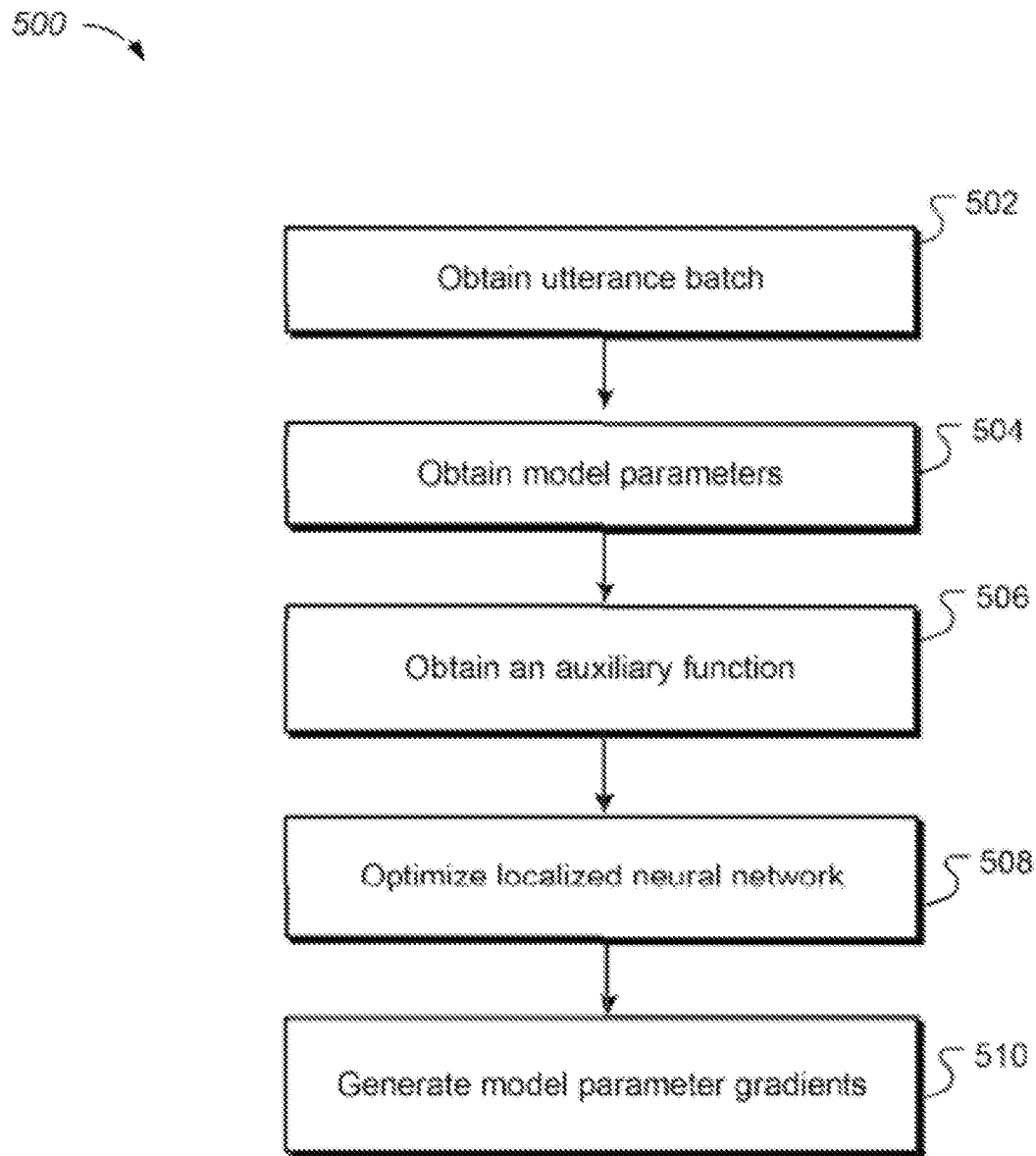
FIG. 5 is a flow chart illustrating an example process for generating model parameter gradients for a speech model.

FIG. 5 is a flow chart illustrating an example process 500 for generating model parameter gradients for a speech model. The process 500 may be performed by data processing apparatus, such as the speech model 108 described above or another data processing apparatus.

The system obtains utterance batch (502). In some implementations, a first sequence-training speech model may obtain a first batch of training frames that represent speech features of first training utterances. In some implementations, a second sequence-training speech model may obtain a second batch of training frames that represent speech features of second training utterances, where the obtaining of the second batch of training frames by the second sequence-training speech model is independent of the obtaining of the first batch of training frames by the first sequence-training speech model.

In some implementations, before the first sequence-training speech model obtains the first batch of training frames, the first sequence-training speech model may obtain an initial batch of training frames, where each training frame represents a sequence of utterances spoken by a training speaker. The first sequence-training speech model may pseudo-randomly select candidate training frames from the initial batch of training frames. The first sequence-training speech model may generate the first batch of training frames using the pseudo-randomly selected candidate training frames.

The system obtains model parameters from a parameter server (504). In some implementations, the first sequence-training speech model may obtain one or more first neural network parameters. In some implementations, the second sequence-training speech model may obtain one or more second neural network parameters, where the obtaining of the second neural network parameters may be independent of (i) the obtaining of the first neural network parameters by the first sequence-training speech model and (ii) the determining of the one or more optimized first neural network parameters by the first sequence-training speech model.

The system obtains an auxiliary function (506). In some implementations, the auxiliary function may represent an approximation of a training objective function of the first sequence-training speech model. For example, the training objective function may be a maximum mutual information (MMI) objective function, a minimum phone error (MPE) objective function, or a state-level minimum Bayes risk objective function.

The system optimizes a localized neural network (508). In some implementations, the first sequence-training speech model may determine one or more optimized first neural network parameters based on (i) the first batch of training frames and (ii) the one or more first neural network parameters. In some implementations, the first sequence-training speech model or the second sequence-training speech model may determine the one or more optimized neural network parameters using an auxiliary function.

In some implementations, the second sequence-training speech model may determine one or more optimized second neural network parameters based on (i) the second batch of training frames and (ii) the one or more second neural network parameters, where the determining of the one or more optimized second neural network parameters by the second sequence-training speech model may be independent of the determining of the one or more optimized first neural network parameters by the first sequence-training speech model.

In some implementations, the first sequence-training speech model may determine one or more optimized first neural network parameters by updating a last hidden layer of a neural network of the first sequence training speech model, using (i) the first batch of training frames and (ii) the one or more first neural network parameters to determine the one or more optimized first neural network parameters.

In some implementations, the first sequence-training speech model may determine one or more optimized first neural network parameters by updating a plurality of hidden layers of a neural network of the first sequence training speech model, using (i) the first batch of training frames and (ii) the one or more first neural network parameters to determine the one or more optimized first neural network parameters.

The system generates model parameter gradients that represent differences between the model parameters and updated model parameters that have been optimized (510). In some implementations, the system may send the model parameter gradients to a parameter server. In some other implementations, the system may send the updated model parameters to the parameter server.

FIG. 6A is an example of a word lattice 600 that may be provided by a speech recognizer system. The word lattice 600 represents multiple possible combinations of words that may form different candidate transcriptions for an utterance.

The word lattice 600 includes one or more nodes 602*a*-*g* that correspond to the possible boundaries between words. The word lattice 600 includes multiple edges 604*a*-I for the possible words in the transcription hypotheses that result from the word lattice 600. In addition, each of the edges 604*a*-I can have one or more weights or probabilities of that edge being the correct edge from the corresponding node. The weights are determined by the speech recognizer module system and can be based on, for example, a confidence in the match between the speech data and the word for that edge and how well the word fits grammatically and/or lexically with other words in the word lattice 600.

For example, initially, the most probable path through the word lattice 600 may include the edges 604*c*, 604*e*, 604*i*, and 604*k*, which have the text "we're coming about 11:30." A second best path may include the edges 604*d*, 604*h*, 604*j*, and 604*l*, which have the text "deer hunting scouts 7:30."

Each pair of nodes may have one or more paths corresponding to the alternate words in the various candidate transcriptions. For example, the initial most probable path between the node pair beginning at the node 602*a* and ending at the node 602*c* is the edge 604*c* "we're". This path has alternate paths that include the edges 604*a*-*b* "we are" and the edge 604*d* "deer".

FIG. 6B is an example of a hierarchical word lattice 650 that may be provided by a speech recognizer system. The word lattice 650 includes nodes 652*a*-I that represent the words that make up the various candidate transcriptions for an utterance. The edges between the nodes 652*a*-I show that the possible candidate transcriptions include: (1) the nodes 652*c*, 652*e*, 652*i*, and 652*k* "we're coming about 11:30"; (2) the nodes 652*a*, 652*b*, 652*e*, 652*i*, and 652*k* "we are coming about 11:30"; (3) the nodes 652*a*, 652*b*, 652*f*, 652*g*, 652*i*, and 652*k* "we are come at about 11:30"; (4) the nodes 652*d*, 652*f*, 652*g*, 652*i*, and 652*k* "deer come at about 11:30"; (5) the nodes 652*d*, 652*h*, 652*j*, and 652*k* "deer hunting scouts 11:30"; and (6) the nodes 652*d*, 652*h*, 652*j*, and 652*l* "deer hunting scouts 7:30".

Again, the edges between the nodes 652*a*-I may have associated weights or probabilities based on the confidence in the speech recognition and the grammatical/lexical analysis of the resulting text. In this example, "we're coming about 11:30" may currently be the best hypothesis and "deer hunting scouts 7:30" may be the next best hypothesis. One or more divisions 654*a*-*d* can be made in the word lattice 650 that group a word and its alternates together. For example, the division 654*a* includes the word "we're" and the alternates "we are" and "deer". The division 654*b* includes the word "coming" and the alternates "come at" and "hunting". The division 654*c* includes the word "about" and the alternate "scouts" and the division 654*d* includes the word "11:30" and the alternate "7:30".

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method executed on data processing hardware that causes the data processing hardware to perform operations comprising:
   receiving a current set of parameter values for a neural network model executable on the data processing hardware;
   obtaining training utterances each comprising one or more predetermined words spoken by a speaker;
   processing the training utterances using the current set of parameter values for the neural network model;
   determining updated parameter values for the neural network model based on the processing of the training utterances; and
   performing stochastic gradient descent optimization to determine corresponding model parameter gradients for the neural network model based on differences between the current set of parameter values and the updated parameter values for the neural network model.

2. The computer-implemented method of claim 1, wherein the operations further comprise sending the corresponding model parameter gradients for the neural network model to a centralized server.

3. The computer-implemented method of claim 2, wherein sending the corresponding model parameter gradients for the neural network model comprises sending the corresponding model parameter gradients for the neural network model to the centralized network without sending the batch of training utterances to the centralized server.

4. The computer-implemented method of claim 1, wherein the current set of parameter values for the neural network model comprise weights and biases of hidden layers of the neural network model.

5. The computer-implemented method of claim 4, wherein the updated parameter values for the neural network model comprise updated weights for the neural network model.

6. The computer-implemented method of claim 1, wherein the neural network model is trained to indicate likelihoods that acoustic feature vectors represent different phonetic units.

7. The computer-implemented method of claim 1, wherein the data processing hardware resides on a respective computing device associated with the speaker that spoke each of the training utterances.

8. The computer-implemented method of claim 7, wherein each of the training utterances is recorded by the respective computing device.

9. The computer-implemented method of claim 7, wherein the respective computing device is in communication with a centralized server via a wide area network.

10. The computer-implemented method of claim 7, wherein the respective computing device comprises a mobile audio player.

11. A system comprising:
data processing hardware; and
memory hardware in communication with the data processing hardware and storing instructions that when executed on the data processing hardware cause the data processing hardware to perform operations comprising:
receiving a current set of parameter values for a neural network model executable on the data processing hardware;
obtaining training utterances each comprising one or more predetermined words spoken by a speaker;
processing the training utterances using the current set of parameter values for the neural network model;
determining updated parameter values for the neural network model based on the processing of the training utterances; and
performing stochastic gradient descent optimization to determine corresponding model parameter gradients for the neural network model based on differences between the current set of parameter values and the updated parameter values for the neural network model.

12. The system of claim 11, wherein the operations further comprise sending the corresponding model parameter gradients for the neural network model to a centralized server.

13. The system of claim 12, wherein sending the corresponding model parameter gradients for the neural network model comprises sending the corresponding model parameter gradients for the neural network model to the centralized network without sending the batch of training utterances to the centralized server.

14. The system of claim 11, wherein the current set of parameter values for the neural network model comprise weights and biases of hidden layers of the neural network model.

15. The system of claim 14, wherein the updated parameter values for the neural network model comprise updated weights for the neural network model.

16. The system of claim 11, wherein the neural network model is trained to indicate likelihoods that acoustic feature vectors represent different phonetic units.

17. The system of claim 11, wherein the data processing hardware resides on a respective computing device associated with the speaker that spoke each of the training utterances.

18. The system of claim 17, wherein each of the training utterances is recorded by the respective computing device.

19. The system of claim 17, wherein the respective computing device is in communication with a centralized server via a wide area network.

20. The system of claim 17, wherein the respective computing device comprises a mobile audio player.

* * * * *